(12) United States Patent
Sun et al.

(10) Patent No.: US 8,704,231 B2
(45) Date of Patent: Apr. 22, 2014

(54) ARRAY SUBSTRATE OF TFT-LCD AND MANUFACTURING METHOD THEREOF

(75) Inventors: Rongge Sun, Beijing (CN); Xin Ye, Beijing (CN)

(73) Assignees: Boe Technology Group Co., Ltd., Beijing (CN); Hefei Xinsheng Optoelectronics Technology Co., Ltd., Hefei (CN)

( * ) Notice: Subject to any disclaimer, the term of this patent is extended or adjusted under 35 U.S.C. 154(b) by 0 days.

(21) Appl. No.: 13/337,665

(22) Filed: Dec. 27, 2011

(65) Prior Publication Data
US 2012/0161142 A1  Jun. 28, 2012

(30) Foreign Application Priority Data
Dec. 28, 2010  (CN) .......................... 2010 1 0611650

(51) Int. Cl.
*H01L 29/04* (2006.01)
(52) U.S. Cl.
USPC .. 257/59; 257/72; 257/E33.053; 257/E33.062
(58) Field of Classification Search
USPC ....................................... 257/72, 59; 438/34
See application file for complete search history.

(56) References Cited

U.S. PATENT DOCUMENTS

| | | | |
|---|---|---|---|
| 6,577,368 B1 * | 6/2003 | Yuh et al. | 349/141 |
| 2002/0140649 A1 * | 10/2002 | Aoyama et al. | 345/87 |
| 2004/0057005 A1 * | 3/2004 | Matsumoto et al. | 349/141 |
| 2006/0215101 A1 | 9/2006 | Yamazaki et al. | |
| 2006/0279684 A1 * | 12/2006 | Park et al. | 349/141 |

FOREIGN PATENT DOCUMENTS

| | | |
|---|---|---|
| CN | 1837907 A | 9/2006 |
| CN | 1881050 A | 12/2006 |

OTHER PUBLICATIONS

First Chinese Office Action dated Jan. 6, 2014; Appln. No. 201010611650.1

* cited by examiner

*Primary Examiner* — A. Sefer
(74) *Attorney, Agent, or Firm* — Ladas & Parry LLP (57) ABSTRACT

An array substrate of a TFT-LCD, comprising: a base substrate; gate lines and data lines formed on the substrate, the gate lines and the data lines crossing with each other to define a plurality of pixel units each of which comprises a thin film transistor, a first electrode layer and a second electrode layer, wherein the first electrode layer is separated from the second electrode layer through an insulation layer; the first electrode layer comprises a plurality of first electrodes separated by openings; the second electrode layer comprises a plurality of second electrodes separated by openings; the second electrodes comprise overlapping electrodes each of which completely overlaps with the first electrodes and non-overlapping electrodes whose edges are completely located within an region corresponding to the openings in the first electrode layer.

6 Claims, 5 Drawing Sheets

ARRAY SUBSTRATE OF TFT-LCD AND MANUFACTURING METHOD THEREOF

BACKGROUND

Embodiments of the disclosed technology relate to an array substrate of a thin film transistor liquid crystal display (TFT-LCD) and a manufacturing method thereof.

Among liquid crystal displays of various types such as Twisted Nematic (TN) mode, Vertical Alignment (VA) mode and transverse electrical field mode (e.g. In-Plane Switching (IPS) or Fringe Field Switching (FFS)), the transverse electrical field mode has advantages of wide viewing angle, low color aberration, high transmittance and so on, and is more and more widely adopted by respective display panel manufacturers.

Figure 1:
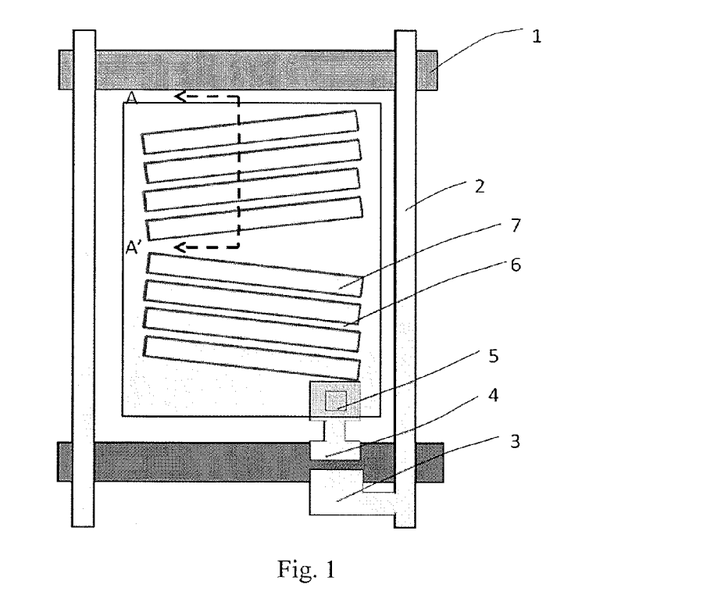
FIG. 1 is a schematic diagram of a pixel unit of a transverse electrical field mode TFT-LCD array substrate in the related arts.
Figure 2:
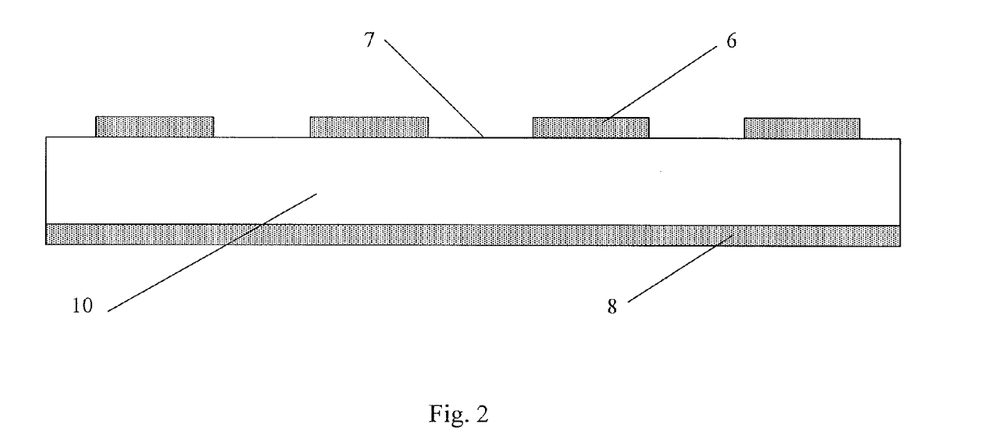
FIG. 2 is a sectional schematic diagram taken along the line A-A' in FIG. 1.

FIGS. 1 and 2 show one pixel unit of a transverse electrode filed mode array substrate in which a gate lines 1 and a data lines 2 cross with each other to define a pixel unit. During manufacturing the array substrate, each structure is formed in the following order: a first electrode layer (generally formed by indium tin oxide (ITO), also be referred as 1-ITO) comprising a first electrode 8, as shown in FIG. 2; a gate lines 1, a gate electrode, and a common electrode line; a first insulating layer; source and drain metal electrode layer (comprising a drain electrode 4 and a source electrode 3 of a thin film transistor) and a data line 2; a second insulating layer, which is etched to form a drain contact hole 5; a second electrode layer 2 (referred as 2-ITO), which comprises second electrodes 6 and openings 7 in the second electrode layer. In the transverse electrical filed mode TFT LCD array substrate as shown in FIG. 2, since the two ITO layers overlap with each other, i.e. the 2-ITO overlaps with the 1-ITO, the storage capacitance is very large, which results in slow charging for the pixel. This problem is particularly apparent in large-sized high definition products and double frequency driving products.

Figure 3:
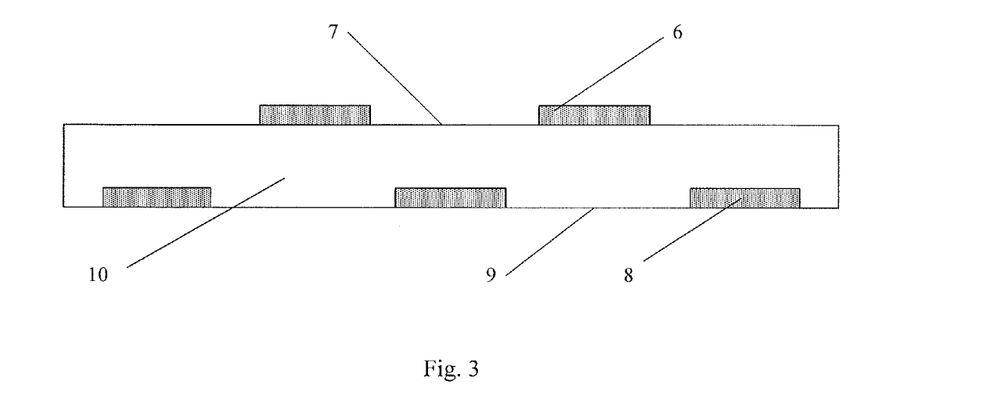
FIG. 3 is another sectional schematic diagram taken along the line A-A' in FIG. 1.

To solve the above problem, an array substrate as shown in FIG. 3 is proposed in the related arts. In the array substrate, openings 9 are formed in the first electrode layer, and openings 7 are formed in the second electrode layer, so that a plurality of first electrodes 8 and second electrodes 6 spaced apart by these openings are formed in the first and second electrode layer, respectively. The first electrode 8 and the second electrode 6 are staggered so that the first electrode layer and the second electrode layer do not overlap with each other. The array substrate may greatly reduce the storage capacitance. However, since the first electrode layer is a transparent layer, the alignment between the layer and the subsequent layers may be relatively difficult, and the alignment accuracy is relatively poor (generally 3 μm or more). If the overlapping of the two electrode layer occurs due to an alignment error, the storage capacitance will change abruptly, which influences a shift of the charging characteristics of a pixel and causes image defects of the panel. Thus, during actual manufacturing, in order to avoid the overlapping of the two electrode layers caused by the alignment error, the opening of the second electrode layer needs to be wide enough (generally needs to be 10 μm or more), which may result in low transmittance of the pixel in the array substrate.

Figure 4:
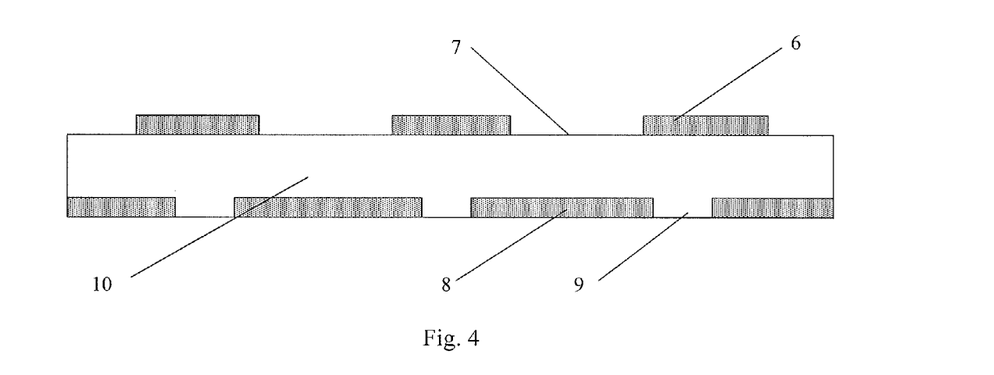
FIG. 4 is still another sectional schematic diagram taken along the line A-A' in FIG. 1.

Another array substrate is proposed in the related arts, as shown in FIG. 4. In the array substrate, openings 9 are formed in the first electrode layer, and openings 7 are formed in the second electrode layer, so that a plurality of first electrodes 8 and second electrodes 6 spaced apart by these openings are formed in the first and second electrode layer, respectively. The first electrode 8 and the second electrode 6 are staggered so that the first electrode layer and the second electrode layer are partially overlapped. This structure may also largely reduce the storage capacitance. In such an array substrate, the opening width of the first electrode layer is smaller than the width of each second electrode in the second electrode layer. Generally, in the transverse electrical field mode TFT-LCD array substrate, the electrode width of the second electrode layer is only 3~4 μm. Thus, the opening width of the first electrode layer is required to be even smaller, only 2~3 μm. It is very difficult to accomplish such an opening width under the conventional process conditions. Similarly, such an array substrate also has the problem that the poor alignment accuracy will influence the change of the storage capacitance, thus the process property is poor. In order to avoid the influence on the storage capacitance by the alignment error, the electrode width of the second electrode layer needs to be greatly increased, which will cause large reduction in the transmittance of the pixel.

SUMMARY

An embodiment of the disclosed technology provides an array substrate of a thin film transistor liquid crystal display (TFT-LCD), comprising: a base substrate; gate lines and data lines formed on the substrate, the gate lines and the data lines crossing with each other to define a plurality of pixel units each of which comprises a thin film transistor, a first electrode layer and a second electrode layer, wherein the first electrode layer is separated from the second electrode layer through an insulation layer; the first electrode layer comprises a plurality of first electrodes separated by openings in the first electrode layer; the second electrode layer comprises a plurality of second electrodes separated by openings in the second electrode layer; the second electrodes comprise overlapping electrodes each of which completely overlaps with the first electrodes and non-overlapping electrodes whose edges are completely located within an region corresponding to the openings in the first electrode layer; and the overlapping electrodes and the opening electrodes are alternately distributed.

Another embodiment of the disclosed technology provides a manufacturing method for an array substrate of a thin film transistor liquid crystal display (TFT-LCD), comprising: depositing a first conductive thin film on a base substrate, and patterning the first conductive thin film to form a first electrode layer, the first electrode layer comprising a plurality of first electrodes separated by openings in the first electrode layer; depositing an insulating film to cover the first electrode layer; and depositing a second conductive thin film, and patterning the second conductive thin film to form the second electrode layer, the second electrode layer comprising a plurality of the second electrodes separated by openings in the second electrode layer, wherein the second electrode comprises overlapping electrodes which completely overlaps with the first electrodes and non-overlapping electrodes whose edges are completely located within an region corresponding to the openings in the first electrode layer; and the overlapping electrodes and the non-overlapping electrodes are alternately distributed.

Further scope of applicability of the disclosed technology will become apparent from the detailed description given hereinafter. However, it should be understood that the detailed description and specific examples, while indicating preferred embodiments of the disclosed technology, are given by way of illustration only, since various changes and modifications within the spirit and scope of the disclosed technology will become apparent to those skilled in the art from the following detailed description.

BRIEF DESCRIPTION OF DRAWINGS

The disclosed technology will become more fully understood from the detailed description given hereinafter and the accompanying drawings which are given by way of illustration only, and thus are not limitative of the disclosed technology and wherein.

DETAILED DESCRIPTION

Embodiments of the disclosed technology now will be described more clearly and fully hereinafter with reference to the accompanying drawings, in which the embodiments of the disclosed technology are shown. Apparently, only some embodiments of the disclosed technology, but not all of embodiments, are set forth here, and the disclosed technology may be embodied in other forms. All of other embodiments made by those skilled in the art based on embodiments disclosed herein without mental work fall within the scope of the disclosed technology.

Embodiments of the disclosed technology provide a TFT-LCD array substrate and a manufacturing method thereof, which can reduce the storage capacitance of the pixel in the TFT-LCD and is easy to be accomplished while maintaining the transmittance under a condition of low alignment accuracy.

Figure 5:
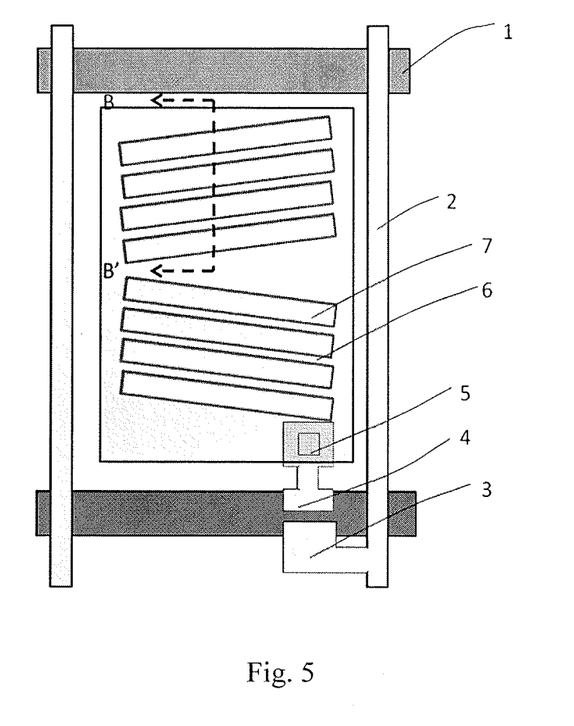
FIG. 5 is a schematic diagram of a pixel unit of a TFT-LCD array substrate according to an embodiment of the disclosed technology.
Figure 6:
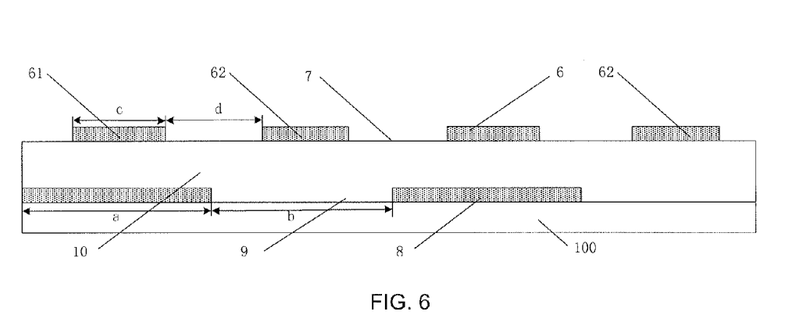
FIG. 6 is a sectional schematic diagram taken along the line B-B' in FIG. 5.

The embodiment of the disclosed technology provides a TFT-LCD array substrate. As shown in FIGS. 5 and 6, the array substrate comprises a base substrate, and gate lines 1 and data lines 2 formed on the base substrate. The gate lines 1 and the data lines 2 cross with each other to define a plurality of pixel units. Each pixel unit comprises a thin film transistor, a common electrode line, a first electrode layer and a second electrode layer.

The first electrode layer is separated from the second electrode layer via an insulation layer 10. The first electrode layer is connected with the common electrode line, i.e., serves as a common electrode. The first electrode layer comprises a plurality of first electrodes separated by opening 9 in the first electrode layer. The second electrode layer is connected with a drain electrode 4 of the thin film transistor through a drain contact hole 5, and comprises a plurality of second electrodes separated by openings 7 in the second electrode layer. The second electrodes 6 comprises overlapping electrodes 61 which completely overlaps with the first electrodes 8 and non-overlapping electrodes 62 whose edges are completely located within a region corresponding to the openings 9 in the first electrode layer. The overlapping electrodes 61 and the non-overlapping electrodes 62 are distributed alternately, i.e., the overlapping electrodes 61 and the non-overlapping electrodes 62 are arranged in a way such that any two neighboring non-overlapping electrodes 62 are separated with one or more overlapping electrodes 61 disposed therebetween.

In the technical solution of the embodiment of the disclosed technology, the second electrodes comprises the overlapping electrodes and the non-overlapping electrodes, the overlapping electrodes are completely overlapped with the first electrodes, and the edges of the non-overlapping electrodes are completely located within the region corresponding to the openings in the first electrode layer, and the overlapping electrode and the non-overlapping electrodes are alternately distributed. With such an arrangement of the first electrodes, the demand on alignment accuracy between the first electrode layer and the second electrode layer is not so high, and the process is easy to be accomplished. At the same time, since it is not necessary to change the electrode width and opening width of the second electrode layer, the transmittance of the pixel will not be deteriorated, and it is easier to be accomplished for large-sized high definition products and double frequency driving products.

Further, there is at least one overlapping electrode between two neighboring non-overlapping electrodes. Some specific embodiments of is the disclosed technology are described below.

First Embodiment

As shown in FIG. 6, only one overlapping electrode is disposed between two neighboring non-overlapping electrodes in the second electrode layer. Each first electrode 8 in the first electrode layer has a width "a", and each opening 9 in the second electrode layer has a width "b". Each second electrode 6 in the second electrode layer has a width "c", and each opening 7 in the second electrode layer has a width "d". Two edges of each non-overlapping electrode 62 in the second electrode layer are completely located within a region corresponding to one opening 9 in the first electrode layer. The width "a" of each first electrode in the first electrode layer, the opening width "b" of the first electrode layer, the width "c" of each second electrode in the second electrode layer, and the opening width "d" of the second electrode layer have the following relationship: $c<a<c+2d$, $c<b<c+2d$, $a+b=2c+2d$. Both the width "a" of each first electrode and the opening width "b" of the first electrode layer are set as larger than the width "c" of each second electrode, but smaller than the sum of double of the opening width "d" of the second electrode layer and the width "c" of each second electrode. Thus, there is a certain distance between the non-overlapping electrode 62 and the edges of the corresponding opening 9 in the first electrode layer. When there is an alignment deviation, the non-overlapping electrode 62 can be still located within the region corresponding to the opening in the first electrode layer, and does not overlap with the first electrodes 8. Similarly, when there is an alignment deviation, the overlapping electrode 61 can be still kept in a position where it completely overlaps with the first electrodes 8, and will not move to the region corresponding to the opening 9 in the first electrode layer. Thus, large change of the storage capacitance due to variation in the overlapping area between the two electrode layers is avoid when there is an alignment deviation.

Preferably, in the present embodiment, the width "a" of each first electrode may be equal to the opening width "d" of the first electrode layer. In this case, the width "a" of each first electrode in the first electrode layer, the opening width "b" of the first electrode layer, the width "c" of each second electrode in the second electrode layer, and the opening width "d" of the second electrode layer have the following relationship:

a=b=c+d. In this case, compared with the structure shown in FIG. 2, the pixel storage capacitance may be reduced by half. In the present embodiment, it is preferable that the width "c" of each second electrode has a value in a range of 2 μm-4 μm, and the opening width "d" of the second electrode layer has a value in a range of 3 μm-6 μm.

In the embodiment of the disclosed technology, as for the storage capacitance, it can be clearly seen that, compared with the related arts as shown in FIG. 2, since the overlapping area of the two electrode layers is reduced by half, the storage capacitance may be reduced by half correspondingly; as for the demand on pattern alignment, compared with the related arts as shown in FIG. 4, it is also lowered. It can be seen from the pattern as shown in FIG. 4 that each opening 9 in the first electrode layer must be completely located within a region corresponding to one second electrode 6. As is well known, the widely used width of the second electrodes 6 is generally only 3-4 μm, thus, the width of each opening 9 in the first electrode layer is smaller than or equal to this value. If the former is equal to the latter, the pattern alignment deviation of the two electrode layers will cause large change of the storage capacitance. If the former is smaller than the latter, firstly, it is difficult to form an opening with such a small size; secondly, the permissible alignment deviation is also very small, at most to about 1 μm. It is also very difficult to be achieved in the array process. In the present embodiment, as shown in FIG. 6, the width "b" of each opening 9 in the first electrode layer has a value of about 9 μm, and its process is easy to be achieved; with regard to the alignment, it will not cause the change of the storage capacitance if the overlapping electrode 61 is completely located within the region corresponding to the first electrode 8, thus, the permissible alignment deviation may be up to about 3 μm and it is easy to perform the process for the array substrate; with regard to the transmittance, the transmittance in the present embodiment is almost the same as those in the related arts as shown in FIGS. 2 and 4, and the transmittance in the related arts as shown in FIG. 3 is poor and is about 10% lower than those of the above several solutions.

Second Embodiment

Figure 7:
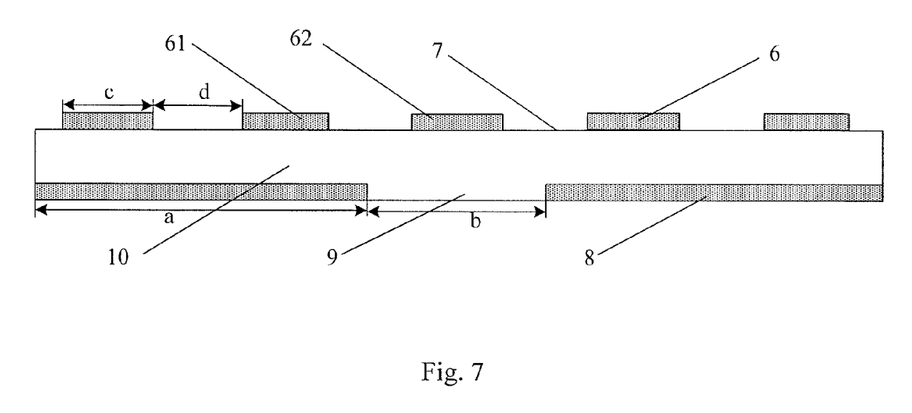
FIG. 7 is another sectional schematic diagram taken along the line B-B' in FIG. 5.

As shown in FIG. 7, two overlapping electrodes 61 are disposed between two neighboring non-overlapping electrodes in the second electrode layer. Each first electrode 8 in the first electrode layer has a width "a", and each opening 9 in the second electrode layer has a width "b". Each second electrode 6 in the second electrode layer has a width "c", and each opening 7 in the second electrode layer has a width "d". Two edges of each non-overlapping electrode 62 in the second electrode layer are completely located within a region corresponding to one opening 9 in the first electrode layer. The width "a" of each first electrode in the first electrode layer, the opening width "b" of the first electrode layer, the width "c" of each second electrode in the second electrode layer, and the opening width "d" of the second electrode layer have the following relationship: $a=2c+2d$, and $b=c+d$. In such a case, the storage capacitance of a pixel may be reduced by about one third.

With regard to the present embodiment, its performance in the storage capacitance may be good as that in the preferable first embodiment, and the storage capacitance is only reduced by about one third compared with the related arts as shown in FIG. 2, but its performances in the pattern alignment and transmittance are the same as those in the first embodiment.

Although one or two overlapping electrodes are disposed between two neighboring non-overlapping electrode, the disclosed technology is not limited thereto. More than two overlapping electrodes may be disposed between two neighboring non-overlapping electrodes. As long as the width "a" of each first electrode in the first electrode layer, the opening width "b" of the first electrode layer, the width "c" of each second electrode in the second electrode layer, and the opening width "d" of the second electrode layer have the following relationship satisfy the following relationship: $c+n(c+d)<a<c+2d+n(c+d)$, $c<b<c+2d$, and $a+b=2c+2d+n(c+d)$, where "n" is an integer greater than or equal to zero, the demands on pattern alignment and transmittance reduce can be satisfied while the storage capacitance is reduced.

Third Embodiment

The embodiment of the disclosed technology further provides a manufacturing method for a TFT-LCD array substrate as described by the above embodiments. The method comprises the following steps.

Step 101: depositing a first conductive thin film, and patterning the first conductive thin film to form a first electrode layer, the first electrode layer comprising a plurality of first electrodes separated by openings in the first electrode layer.

Further, depositing a gate line metal layer thin film, and patterning the gate line metal layer thin film to form a gate line, a gate electrode and a common electrode line, wherein the first electrode layer is connected with the common electrode line, i.e., serves as a common electrode; depositing a first insulation layer and a source/drain metal layer, and patterning the source/drain metal thin film to form a thin film transistor and a data line; depositing a second insulating layer, and forming a drain electrode contact hole at the drain electrode of the thin film transistor through a patterning process.

In the present embodiment, the first electrode layer can be formed before the gate line, the gate electrode and the common electrode line are formed on the base substrate.

It should be noted that the sequence of the processing steps for forming the above patterns is only an example, and the disclosed technology will not be limited thereto.

Step 102: depositing a second conductive thin film, and patterning the second conductive thin film to form a second electrode layer, wherein the second electrode layer is connected with the drain electrode of the thin film transistor through the drain electrode contact hole, i.e., serves as a pixel electrode. The second electrode layer comprises a plurality of second electrodes separated by openings in the second electrode layer.

The second electrodes 6 comprises overlapping electrodes 61 which completely overlaps with the first electrodes 8 and non-overlapping electrodes 62 whose edges are completely located within a region corresponding to the openings 9 in the first electrode layer. The overlapping electrodes 61 and the non-overlapping electrodes 62 are distributed alternately.

In the present embodiment, the patterning process comprises procedures such as applying photoresist, exposing, developing, etching, removing the photoresist, and so on.

Further, at least one overlapping electrode is disposed between two neighboring non-overlapping electrodes.

The width "a" of each first electrode in the first electrode layer, the opening width "b" of the first electrode layer, the width "c" of each second electrode in the second electrode layer, and the opening width "d" of the second electrode layer have the following relationship satisfy the following relationship: $c+n(c+d)<a<c+2d+n(c+d)$, $c<b<c+2d$, and $a+b=2c+2d+n(c+d)$, where "n" is an integer greater than or equal to zero.

If one overlapping electrode is disposed between two neighboring non-overlapping electrodes, the width "a" of each first electrode in the first electrode layer, the opening width "b" of the first electrode layer, the width "c" of each second electrode in the second electrode layer, and the opening width "d" of the second electrode layer have the following relationship: c<a<c+2d, c<b<c+2d, a+b=2c+2d.

The width "a" of each first electrode in the first electrode layer, the opening width "b" of the first electrode layer, the width "c" of each second electrode in the second electrode layer, and the opening width "d" of the second electrode layer may also have the following relationship: a=b=c+d.

In the technical solution of the embodiment of the disclosed technology, the second electrodes comprises the overlapping electrodes and the non-overlapping electrodes, the overlapping electrodes are completely overlapped with the first electrodes, and the edges of the non-overlapping electrodes are completely located within the region corresponding to the openings in the first electrode layer, and the overlapping electrode and the non-overlapping electrodes are alternately distributed. With such an arrangement of the first electrodes, the demand on alignment accuracy between the first electrode layer and the second electrode layer is not so high, and the process is easy to be accomplished. At the same time, since it is not necessary to change the electrode width and opening width of the second electrode layer, the transmittance of the pixel will not be deteriorated, and it is easier to be accomplished for large-sized high definition products and double frequency driving products.

The above embodiments are described by an example in which the first electrode layer serves as a common electrode, and the second electrode layer serves as a pixel electrode. However, the disclosed technology is not limited thereto, the first electrode layer can serve as a pixel electrode and the second electrode layer can serve as a common electrode.

In addition, the shape of the openings in the first and second electrode layers are not particularly limited, for example, the openings in the first and second electrode layers can have a slit shape.

Through the description of the above embodiments, those skilled in the art may clearly understand that the disclosed technology may be accomplished by means of software plus necessary commonly used hardware, of course, may also be accomplished by hardware. However, the former is preferable embodiment in most cases. Based on such understanding, the technical solution of the disclosed technology substantially or partially for the portion which makes contribution to the related arts, may be embodied in a form of software products. The computer software products may be stored in the readable storage medium, such as soft disk, hard disk or optical disk of a computer, and comprise a number of commands used to make a computer apparatus (it may be a personal computer, a server, or network apparatus and so on) to execute the method described by various embodiments of the present invention.

It should be noted that the above embodiments only have the purpose of illustrating the disclosed technology, but not limiting it. Although the disclosed technology has been described with reference to the above embodiment, those skilled in the art should understand that modifications or alternations can be made to the solution or the technical feature in the described embodiments without departing from the spirit and scope of the disclosed technology.

What is claimed is:

1. An array substrate of a thin film transistor liquid crystal display (TFT-LCD), comprising:

a base substrate;

gate lines and data lines formed on the substrate, the gate lines and the data lines crossing with each other to define a plurality of pixel units each of which comprises a thin film transistor, a first electrode layer and a second electrode layer, wherein the first electrode layer is separated from the second electrode layer through an insulation layer; the first electrode layer comprises a plurality of first electrodes separated by openings in the first electrode layer; the second electrode layer comprises a plurality of second electrodes separated by openings in the second electrode layer; the second electrodes comprise overlapping electrodes each of which completely overlaps with the first electrodes and non-overlapping electrodes whose edges are completely located within an region corresponding to the openings in the first electrode layer; and the overlapping electrodes and the non-overlapping electrodes are alternately distributed, and wherein the width "a" of each first electrode, the opening width "b" of the first electrode layer, the width "c" of each second electrode, and the opening width "d" of the second electrode layer have the following relationship: width "d" of the second electrode layer have the following relationship: c+n(c+d)<a<c+2d+n(c+d), c<b<c+2d, and a+b=2c+2d+n(c+d), wherein "n" is an integer greater than or equal to zero.

2. The array substrate of claim 1, wherein the first electrodes serve as a common electrode, and the second electrodes serve as a pixel electrode.

3. The array substrate of claim 1, wherein at least one overlapping electrode is disposed between two neighboring non-overlapping electrodes.

4. The array substrate of claim 1, wherein one overlapping electrode is disposed between two neighboring non-overlapping electrodes, and the width "a" of each first electrode, the opening width "b" of the first electrode layer, the width "c" of each second electrode, and the opening width "d" of the second electrode layer have the following relationship: c<a<c+2d, c<b<c+2d, and a+b=2c+2d.

5. The array substrate of claim 4, wherein the width "a" of each first electrode, the opening width "b" of the first electrode layer, the width "c" of each second electrode, and the opening width "d" of the second electrode layer have the following relationship: a=b=c+d.

6. The array substrate of claim 1, wherein the first electrode layer is closer to the base substrate than the second electrode layer.

* * * * *

UNITED STATES PATENT AND TRADEMARK OFFICE
CERTIFICATE OF CORRECTION

PATENT NO. : 8,704,231 B2
APPLICATION NO. : 13/337665
DATED : April 22, 2014
INVENTOR(S) : Sun et al.

Page 1 of 1

It is certified that error appears in the above-identified patent and that said Letters Patent is hereby corrected as shown below:

In the Claims

In claim 1 at column 8, lines 27-33; the term

--wherein the width "a" of each first electrode, the opening width "b" of the first electrode layer, the width "c" of each second electrode, and the opening width "d" of the second electrode layer have the following relationship: width "d" of the second electrode layer have the following relationship: $c+n(c+d)<a<c+2d+n(c+d)$, $c<b<c+2d$, and $a+b=2c+2d+n(c+d)$, wherein "n" is an integer greater than or equal to zero--.

should read

--wherein the width "a" of each first electrode, the opening width "b" of the first electrode layer, the width "c" of each second electrode, and the opening width "d" of the second electrode layer have the following relationship: $c+n(c+d)<a<c+2d+n(c+d)$, $c<b<c+2d$, and $a+b=2c+2d+n(c+d)$, wherein "n" is an integer greater than or equal to zero--.

Signed and Sealed this
Thirteenth Day of January, 2015

Michelle K. Lee
*Deputy Director of the United States Patent and Trademark Office*